G. T. Savory.
Tedder.
Nº 85858. Patented Jan. 12, 1869.
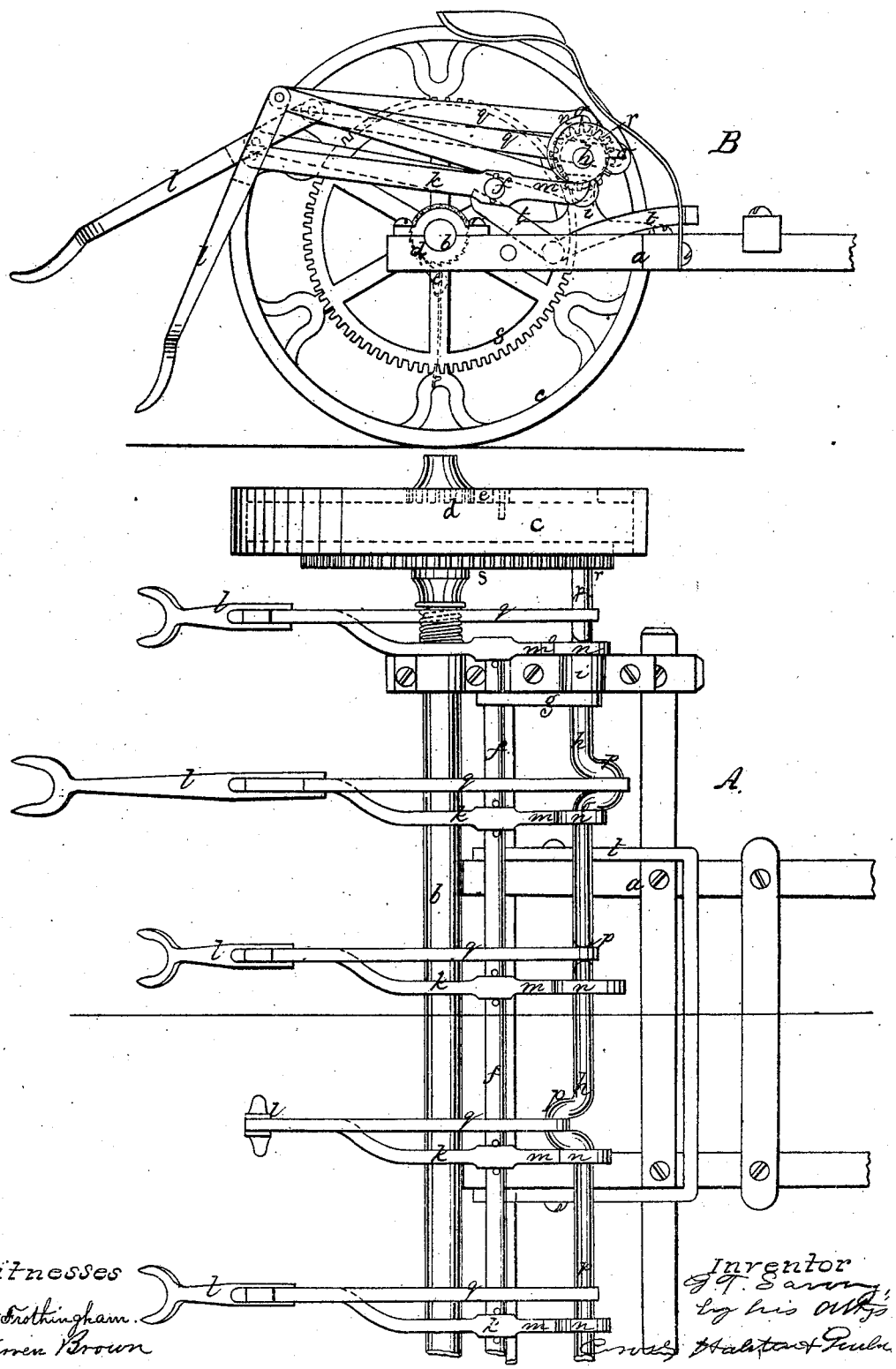
Witnesses
M. W. Frothingham.
C. Warren Brown
Inventor
G. T. Savory
by his Atty's
Halstead & Foula

GEORGE THOMAS SAVARY, OF BYFIELD, MASSACHUSETTS.

Letters Patent No. 85,858, dated January 12, 1869.

IMPROVEMENT IN HAY-SPREADERS.

The Schedule referred to in these Letters Patent and making part of the same.

*To all whom it may concern:*

Be it known that I, GEORGE THOMAS SAVARY, of Byfield, in the county of Essex, and State of Massachusetts, have invented an Improved Hay-Tedder; and I do hereby declare that the following, taken in connection with the drawings which accompany and form part of this specification, is a description of my invention sufficient to enable those skilled in the art to practise it.

This invention has reference to the method of operating a series of tedder-forks, each of which forks is hung upon the outer end of a lever, fulcrumed upon a rod or shaft, and having its short arm projecting back under a cam and crank-shaft, the lever-arm being depressed by a cam, and thereby lifting the fork, (which drops by gravity as the cam rotates,) the cam-shaft also carrying a series of cranks, to each of which the top of a fork is jointed by a crank-rod, so that, as the crank and cam-shaft rotates, the tines of each fork have a compound rear and upward motion imparted to them, to throw up the hay, a motion toward the carriage and over the hay, whilst thrown up, and a downward motion, after being thrown forward, to bring them to the ground, in position for again moving back to toss the hay.

It is in this peculiar construction and arrangement of the fork-actuating mechanism, that my invention consists.

The drawings represent a tedding-machine, embodying my improvements.

A shows a plan of the machine.

B, a side elevation of the same.

*a* denotes the carriage-frame, on the rear end of which is journalled an axle, *b*, mounted upon wheels, *c*.

Each wheel runs loosely upon the axle, in one direction, but rotates the shaft in the opposite direction, each end of the shaft having fixed to it a ratchet, *d*, with which engages a spring-pawl, *e*, hung to the wheel.

Parallel with the axle *b* is a fork-shaft or rod, *f*, which is hung, by arms or links *g*, to a crank-shaft, *h*, the shaft *h* being hung in stationary bearings *i*, and the fork-rod *f* being capable of vertical movement from said shaft.

On the rod *f* is a series of levers, *k*, each turning loosely on the rod, and each lever extends back over the axle *b*, and bears, at its outer end, the shank *l* of a tedding-fork, each fork being hung loosely to its lever, or so as to be capable of free backward-and-forward motion thereupon.

The inner end or arm *m* of each lever projects forward under a cam, *n*, on the crank and cam-shaft *h*, rotation of the crank-shaft causing each cam *n* to depress its lever-arm *m*, and thereby lift the fork, the fork falling by gravity as each cam-projection *o* passes the lever-arm.

Adjacent to each cam, on the shaft *h*, is a crank, *p*, to which the upper end of the fork-shank opposite thereto is connected by a link, *q*, as seen in the drawings.

As the crank-shaft is rotated, each crank imparts a swinging movement to the fork-shank to which it is connected, thereby effecting a forward-and-back movement of the fork, the fork, in its rear movement, taking up the hay and throwing it rearward, and, in its front movement, coming into position for a new supply.

But, as the fork in such forward movement would not pass over the hay if it had simply the motion imparted to it by the crank, and would not throw up the hay, as is necessary, (to turn it, as in hand-tedding,) each fork must have an upward movement, both to effect the turning of the hay, and to bring the fork in position to go forward over and clear from the hay, that it may then fall in front of unturned hay; and to effect this, I fulcrum each fork-shank upon a tilting lever, *k*, and impart a vertical movement to the forks by means of cams *n* on the crank-shaft, which cams operate the levers, as described.

Each crank and the adjacent cam are arranged and timed relatively as follows:

The fork-tines rest upon the ground, when brought nearest to the carriage, or in position to take the hay. While the crank is throwing the tines to the rear, to gather the hay, the cam acts upon the fork-lever, and raises the fork, bringing the tines to their highest position at the end of the rear movement, the rear and upward movement being effected simultaneously, and with such quickness as to throw the hay upward, so that it will turn and fall, and be left in the best position for drying.

The tines, being now up, are kept so by the cam, while the crank effects their return to their frontmost position, and, as they reach this position, the cam projection passes the lever-arm, and the tines fall to or nearly to the ground, in position to again throw back and to toss a fresh bunch of hay.

The forks are so arranged that they rest loosely upon the ground, and conform to the uneven surface over which the machine may be passing.

The motion of the crank and cam-shaft (and the resultant motion of the forks) is effected as follows:

At one or both ends of the crank-shaft is a gear-pinion, *r*, meshing into and driven by a gear-wheel, *s*, fixed upon the axle *b*. As the carriage is driven forward, the axle is turned by the wheels, and the rotation of the axle and its gear *s*, effects the rotation of the pinion *r* and the crank-shaft, while, as rotation of the wheels in the opposite direction imparts no rotation to the axle, the forks will remain stationary, relatively to the carriage, when the machine is moving back.

Any suitable clutch-mechanism may be used to connect and disconnect the driving-gear, so that the crank-shaft may be brought into operation at the hay-making grounds, and may be thrown out of gear when riding to and from the grounds.

To lift all the forks off the ground, the fork-rod *f* may rest upon a lever-frame, *t*, by depression of the front of which the rod, with all its forks, will be raised, as will be readily understood.

The several pairs of cranks and cams are preferably so arranged respectively, that the forks shall act in succession, as will be readily understood from the drawings.

The machine, organized as described, is very simple in arrangement, is strong and enduring, and may be manufactured at a low cost, compared to the cost of tedding-machines as now made and used.

For lightness, the forks, the levers, and the links may all be made of wood.

I claim a hay-tedding machine, having a series of forks hung upon tilting levers, and connected by links with the cranks of a revolving crank and cam-shaft, the cams of which effect the rise of the forks, while the cranks effect the backward-and-forward motions of the forks, substantially as described.

Also, in a hay-tedding machine, the arrangement of the forks $l\ l$ to be self-adjusting to the varying surface of the ground over which they operate, substantially as described.

GEO. T. SAVARY.

Witnesses:
J. B. CROSBY,
FRANCIS GOULD.